(12) United States Patent
Trtilek

(10) Patent No.: US 10,806,100 B1
(45) Date of Patent: Oct. 20, 2020

(54) GROW CABINET AND SYSTEM FOR GROWING PLANTS

(71) Applicant: Mendel Systems, Inc., Houston, TX (US)

(72) Inventor: Martin Trtilek, Bilovice nad Svitavou (CZ)

(73) Assignee: Mendel Systems, Inc., Houston, TX (US)

(*) Notice: Subject to any disclaimer, the term of this patent is extended or adjusted under 35 U.S.C. 154(b) by 0 days.

(21) Appl. No.: 16/656,850

(22) Filed: Oct. 18, 2019

(51) Int. Cl.
*A01G 9/24* (2006.01)
*F21V 8/00* (2006.01)

(52) U.S. Cl.
CPC ............. *A01G 9/249* (2019.05); *A01G 9/246* (2013.01); *G02B 6/009* (2013.01); *G02B 6/0051* (2013.01); *G02B 6/0055* (2013.01); *G02B 6/0085* (2013.01); *G02B 6/0088* (2013.01)

(58) Field of Classification Search
CPC ...... A01G 9/246; A01G 9/249; G02B 6/0051; G02B 6/0055; G02B 6/0085; G02B 6/0088; G02B 6/009; G06F 1/20; G06F 1/206
USPC .............................................. 47/17; 454/184
See application file for complete search history.

(56) References Cited

U.S. PATENT DOCUMENTS

| | | | |
|---|---|---|---|
| 4,170,844 A | 10/1979 | Steele | |
| 4,337,986 A | 7/1982 | Haub et al. | |
| 6,000,173 A | 12/1999 | Schow et al. | |
| 7,382,332 B2 | 6/2008 | Essig et al. | |
| 9,429,521 B2 | 8/2016 | Kramer et al. | |
| 9,974,243 B2 | 5/2018 | Martin | |
| 10,455,777 B1 * | 10/2019 | Dennison ............... | A01G 22/00 |

(Continued)

FOREIGN PATENT DOCUMENTS

| CN | 105684787 A | 6/2016 |
|---|---|---|
| CN | 107070884 A | 8/2017 |

(Continued)

OTHER PUBLICATIONS

Anonymous, How to choose a grow light URL: https://www.hydroponics.net/items/details/choose_a_grow_light.php Accessed Date: Jul. 1, 2019.

(Continued)

*Primary Examiner* — Joshua D Huson
*Assistant Examiner* — Brady W Frazier
(74) *Attorney, Agent, or Firm* — Werschulz Patent Law, LLC; Patricia P. Werschulz, Esq.

(57) ABSTRACT

An energy efficient system for a grow cabinet that maintains optimum growing conditions by reducing the heat contribution of the lighting and distributing air throughout the cabinet to maintain a set temperature uniformly. The system, using a LED lighting module with a reflective light guide plate, provides cool light uniformly to a plurality of plants in the grow cabinet, thereby reducing the amount of cooling required inside to maintain temperature. The lighting module is separate from the growing area, minimizing heat transfer to a grow chamber within the grow cabinet. The system advantageously dissipates heat through a plurality of metal components and beneficial air flow throughout the lighting module and growing chamber. The grow cabinet in the system provides precision control of the light and temperature while having a small footprint and low vertical clearance.

11 Claims, 13 Drawing Sheets

(56) References Cited

U.S. PATENT DOCUMENTS

| | | | |
|---|---|---|---|
| 2001/0054252 A1* | 12/2001 | Kleinwachter | A01G 9/1438 47/17 |
| 2004/0007348 A1* | 1/2004 | Stoller | H02B 1/565 165/47 |
| 2010/0139165 A1* | 6/2010 | Oyama | A01G 7/045 47/1.01 R |
| 2012/0198762 A1 | 8/2012 | Lee | |
| 2013/0260666 A1* | 10/2013 | Rodriquez | H05K 5/0213 454/184 |
| 2013/0267161 A1* | 10/2013 | Iqbal | H05K 7/20736 454/184 |
| 2013/0326950 A1 | 12/2013 | Nilles | |
| 2014/0187137 A1* | 7/2014 | Yang | H05K 7/20745 454/184 |
| 2015/0027048 A1 | 1/2015 | Fok et al. | |
| 2015/0111483 A1* | 4/2015 | Liu | H05K 7/20736 454/184 |
| 2016/0192601 A1* | 7/2016 | Kao | A01G 9/14 47/17 |
| 2017/0035008 A1 | 2/2017 | Ellins et al. | |
| 2017/0231169 A1* | 8/2017 | Gillard | A01G 9/1415 47/17 |
| 2018/0007845 A1* | 1/2018 | Martin | A01G 31/047 |
| 2018/0288950 A1* | 10/2018 | Ogata | A01G 9/16 |
| 2018/0352755 A1 | 12/2018 | Szoradi et al. | |
| 2019/0075734 A1* | 3/2019 | Motoyama | A01G 7/045 |
| 2019/0090330 A1 | 3/2019 | Aykroyd et al. | |
| 2019/0191643 A1 | 6/2019 | Chan et al. | |
| 2019/0200542 A1* | 7/2019 | Hall | A01G 7/02 |
| 2019/0289792 A1* | 9/2019 | Kim | A23B 7/015 |
| 2019/0320605 A1* | 10/2019 | Buj | A01G 9/249 |
| 2019/0320627 A1* | 10/2019 | Lawyer | A01K 1/0058 |
| 2019/0327910 A1* | 10/2019 | Montagano | A01G 9/20 |

FOREIGN PATENT DOCUMENTS

| | | |
|---|---|---|
| CN | 107409996 A | 12/2017 |
| CN | 107494237 A | 12/2017 |
| KR | 20180057298 A | 5/2018 |
| WO | 2003045413 A1 | 6/2003 |
| WO | 2002012127 A3 | 12/2004 |
| WO | 2016147195 A1 | 9/2016 |
| WO | 2017103922 | 12/2017 |

OTHER PUBLICATIONS

Anonymous, Osunby LED grow light 45W UV IR growing lamp for indoor plants hydroponic plant grow light URL: https://www.amazon.com/Osunby-Growing-Indoor-Plants-Hydroponic/dp/B075JFPLY1 Accessed: Jul. 5, 2019.

Anonymous, Planning the best layout for your grow lights URL: https://www.maximumyield.com/planning-the-best-layout-for-your-grow-lights/2/3520 Published Date: Sep. 6, 2017.

Brechner, Melissa et al., Hydroponic spinach production handbook URL:http://cea.cals.cornell.edu/attachments/CU%20baby%20spinach%20handbook%20section%201%2 0system%20components.pdf Accessed Date: Jul. 1, 2019.

Elejalde-Ruiz, Alexia, Hydroponic Farm Sows Seeds of Success Sustainable Solutions, Tribune News Service, appearing in the Star Ledger, Oct. 3, 2019, Newark, NJ, US.

* cited by examiner

GROW CABINET AND SYSTEM FOR GROWING PLANTS

TECHNICAL FIELD

The present disclosure relates generally to a grow cabinet and a system for the grow cabinet. More particularly, the present disclosure relates to a grow cabinet and an energy-efficient system for growing plants in a controlled environment in the grow cabinet.

BACKGROUND

Many people desire to grow their own vegetables and herbs for many reasons. Growing your own vegetables and herbs provides the freshest possible produce on the grower's table. People equate freshness with maximum nutritive value and premium quality.

When vegetables and herbs are home-grown, the user knows what if any fertilizer has been used, whether the seeds have been genetically altered and understands more about the foodstuff itself. Growing your own produce can provide the highest quality at a reasonable cost.

At the same time, many people who desire to grow their own produce do not have access to sufficient land to plant. Urban dwellers may have limited or no access to the outdoors such that a container garden on a balcony or fire escape is not possible. Others may live in an area where the weather is not favorable to a particular type of vegetable or herb or the growing season is too short. Some people want to grow produce the year round.

Many have taken their gardening indoors and use a grow cabinet, sometimes called a grow box to provide year-round growing without needed any access to land or the outdoors. Grow cabinets also protect the plants against pests and diseases.

Grow cabinets can be soil-based, aeroponic, hydroponic or combinations thereof. All require water in some form and ventilation as well as light. Grow cabinets have a relatively large footprint and can use significant space in a small apartment. Grow cabinets can be expensive to operate, requiring a significant amount of electricity to operate the lights, pumps, cooling systems and fans to maintain optimal growing conditions. There is a secondary effect of raising the ambient room temperature that requires additional cooling.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a compact grow cabinet for growing a plurality of plants. Accordingly, an aspect of an example embodiment in the present disclosure provides a grow cabinet with a lighting module and a cooling module that allows close placement of the lighting module to a growing chamber thereby reducing a grow cabinet height.

Another aspect of an example embodiment in the present disclosure is to provide an energy efficient grow cabinet for growing a plurality of plants. Accordingly, an aspect of an example embodiment in the present disclosure provides a grow cabinet with a lighting module that uses light-emitting diodes to provide light to a growing chamber, making the lighting module more energy efficient.

A further aspect of an example embodiment in the present disclosure is to provide an energy-efficient grow cabinet for growing a plurality of plants. Accordingly, the present disclosure provides a cooling module that uses an energy efficient thermoelectric cooler to provide cooling air throughout the grow cabinet that dissipates heat from a power supply and a lighting module.

Yet another further aspect of an example embodiment in the present disclosure is to provide a system that provides an energy-efficient grow cabinet for growing a plurality of plants. Accordingly, the present disclosure provides a system comprising a lighting module, a cooling module and a metal cabinet shell that synergistically dissipates heat quickly through the use of LED lighting, a thermoelectric cooler, a systematic flow of cooling air and a plurality of heat-dissipating metal components to produce an energy efficient grow cabinet system.

Accordingly, the present disclosure describes an energy efficient system for a grow cabinet that maintains optimum growing conditions by reducing the heat contribution of the lighting and distributing air throughout the cabinet to maintain temperature uniformity. The system, using a LED lighting module with a reflective light guide plate, provides cool light uniformly to a plurality of plants in the grow cabinet, thereby reducing the amount of cooling required inside a growing chamber to maintain temperature. The lighting module is separate from the growing area, minimizing heat transfer to a grow chamber within the grow cabinet. The system advantageously dissipates heat through a plurality of metal components and beneficial air flow throughout the lighting module and growing chamber. The grow cabinet in the system provides precision control of the light and temperature while having a small footprint and low vertical clearance.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

Figure 1:
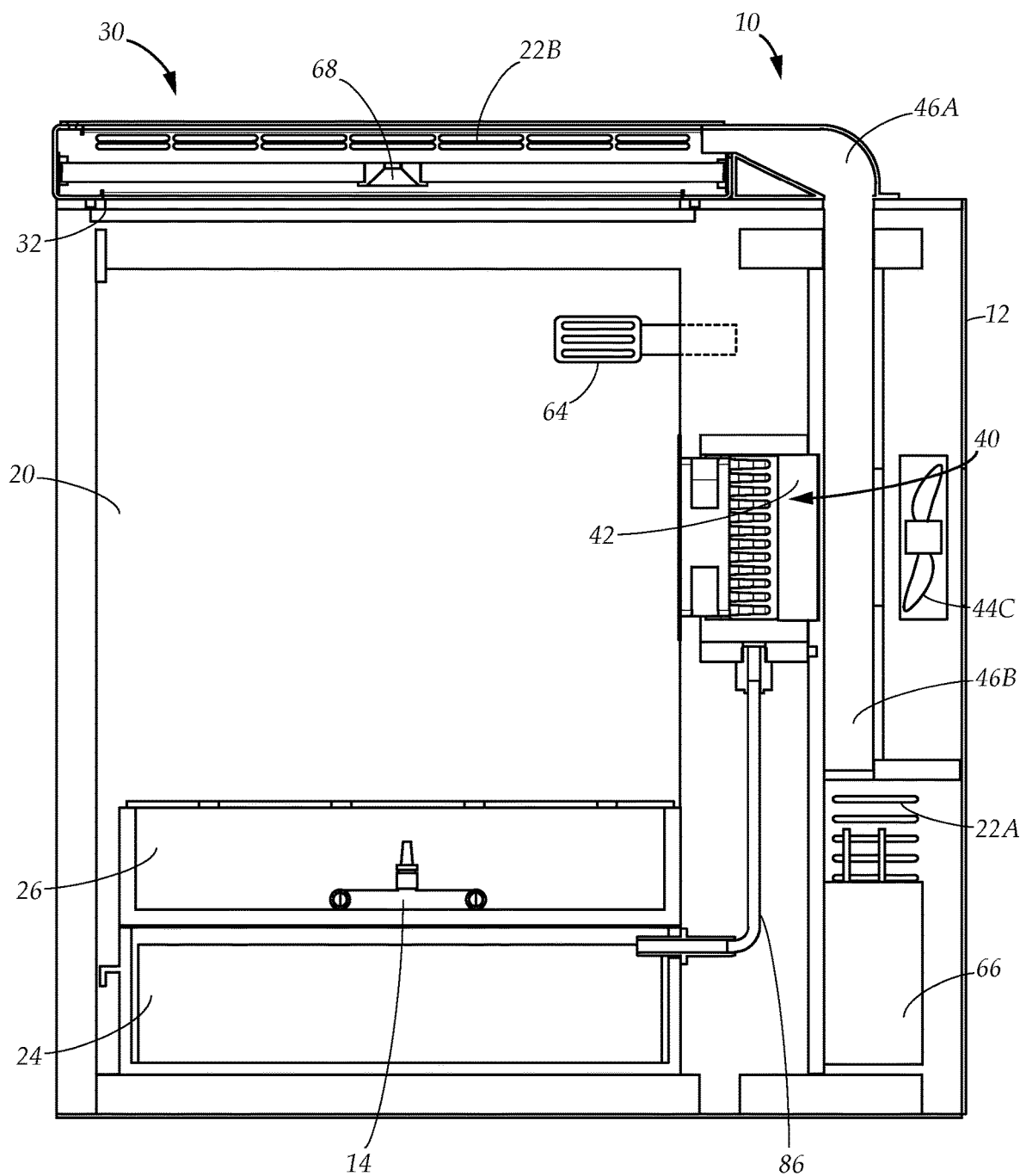
FIG. 1 is a cross-section view from a right side of an example embodiment of a grow cabinet in a grow cabinet system.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

FIGS. 1-5 illustrate a grow cabinet 10 in an energy-efficient system for growing plants in a space-efficient, relatively compact manner. The grow cabinet 10 has a growing chamber 20 and a geyser pump outlet 14. The grow cabinet 10 has an exterior metal shell 12 constructed from metal, preferably heat conducting metals such as steel, aluminum, copper and alloys thereof. The specific metal is not a limitation.

The grow cabinet 10 is useful for hydroponic cultivation, but this is not a limitation. The grow cabinet 10 and the energy-efficient system described herein is useful for other types of cultivation such aeroponics as a non-limiting example.

The grow cabinet 10 has a lighting module 30. The lighting module 30 provides indirect light to the growing chamber 20. The lighting module 30 is above the growing chamber 20 with a layer of translucent heat insulating material 32 disposed therebetween, thermally insulating the growing chamber from heat generated by the lighting module. In one example embodiment, the heat insulating material 32 is a translucent polycarbonate plate. However, any heat insulting material that is translucent with regard to the wavelengths in the lighting module is included within the inventive concept. The heat-insulating material 32 allows the light module 30 to be placed closer to the growing chamber 20, resulting in a more compact grow cabinet 10.

The grow cabinet 10 has a cooling module 40 configured for maintaining the growing chamber 20 at a uniform temperature throughout. The cooling module cools the lighting module 30 and an electronic control unit (ECU) 66.

The ECU 66 is configured for controlling the lighting module 30, the geyser pump outlet 14 and the cooling module 40, maintaining temperature in the growing chamber 20. In one example embodiment, the ECU 66 maintains humidity in the growing chamber. The ECU 66 is in communication with a sensor 64 in the growing chamber 20 and with at least one camera 68 that is capable of capturing images in the growing chamber 20. The at least one camera 68 is above the growing chamber 20. In one example embodiment, the sensor 64 monitors temperature in the growing chamber 20.

In another example embodiment, the sensor 64 monitors temperature and humidity in the growing chamber 20. In one example embodiment, the ECU controls the humidity which is accomplished through adjusting the frequency of a plurality of bubbles from the geyser pump outlet 14 and the resulting condensation produced by the geyser pump is carried away through a condensate outlet 86.

In another example embodiment, an ultrasonic humidifier provides moisture when the grow cabinet 10 is not in a hydroponic mode.

In one example embodiment, the ECU 66 is in wireless communication with a network such as the Internet, either directly or indirectly through an application that runs on a handheld computing device, such as a smart phone or tablet, on a computer such as laptop or desktop or on similar electronic devices either presently known or developed in the future.

The growing chamber 20 has a nutrient tank 26 above a reservoir tank 24. The nutrient tank 26 can contain a solid substrate for growing plants or can be a completely aqueous solution. The substrate can be nutrient-enriched water with or without solid substances or other variations useful in hydroponic, aeroponic, traditional soil and non-traditional soil gardening. The type of gardening is not a limitation and the system is useful for any type of gardening conducted in a grow cabinet 10. The geyser pump outlet 14 pumps liquid from the reservoir tank 24 to the nutrient tank 26 in the growing chamber 20. The geyser pump outlet 14 aerates the water in the nutrient tank 26 causing bubbles where the nutrients and roots of the plants 100 are, and the same geyser pump outlet 14 is also used to transfer water the reservoir tank 24 to the nutrient tank 26. The geyser pump 84 is a rear section of the metal cabinet shell 12.

The growing chamber 20, the geyser pump outlet 14, geyser pump 84, the lighting module 30, the cooling module 40 and ECU 66 are disposed within the cabinet shell 12. The cabinet shell has a plurality of doors 16 opening in a front of the grow cabinet 10 for removal of the plants 100, filling the reservoir tank 24, accessing the nutrient tank 26 as well as allowing maintenance and repair.

The cooling module 40 has a first fan 44C pulls in ambient air 102 from the air outside the grow cabinet 10. The cooling module 40 has a first channel 46A in fluid communication with the lighting module 30 directing cooling air 104 from the first fan 44C in a rear of the grow cabinet 10 over the lighting module 30.

The cooling air 104 exits through a plurality of vents 22B at a top of the grow cabinet 10. The cooling air 104 works in conjunction with the metal cabinet shell 12 which is in contact with the lighting module 30 to dissipate heat from the lighting module so that the lighting module can be positioned closer to the plants 100 so that a more compact grow cabinet is possible without exposing the plants to excessive damaging heat from the lighting module. Controlling the fan 44C speed is one way to control the grow chamber 20 temperature.

Adjacent to the ECU is a power supply 80 that can generate heat during operation. The fan 44C directs cooling air 106 over the ECU 66 through a second channel 46B which is in fluid communication with the ECU 66. The cooling air prevents the electronics in the ECU 66 from overheating.

The cooling air 106 exits through an air vent 22A in the metal cabinet shell 12 adjacent to the ECU.

The cooling module 40 has a thermoelectric cooler (TEC) 42 (also known as a Peltier device or Peltier heat pump) in a rear portion of the growing chamber 20. The cooling module 40 has a second fan 44A and a third fan 44B. The second fan 44A and third fan 44B take in air 108 from the growing chamber 20, the air 108 in fluid communication with the TEC 42. The TEC 42 cools the air 108 and the second fan 44A returns the cool air 108 back to the growing chamber 20. The third fan 44B blows the cool air into the first channel 46A to further cool the lighting module 30 and into the second channel 46B to further cool the ECU 66. In one example embodiment, pressure differentials assure that the air 108 is properly distributed within the channels 46A, 46B. In another example embodiment hoses within the channels properly distribute the air 108.

Condensate from the TEC 42 is carried away from the TEC 42 by the condensate outlet 86 that collects the condensate and channels it into the reservoir tank 24.

The cooling module 40 by employing a cooling air flow 102 from the outside and cooled air 108 from the TEC 42 into the channels 42A, 42B mitigate the major heat sources in the typical grow cabinet, the lighting module 30, the geyser pump 84 and the power supply 80, allowing for a more compact structure and better control of the growing chamber 20 temperature.

In one example embodiment, the TEC 42 provides additional cool air 108 to the growing chamber 20 to shock the plants, similar to a quick temperature drop experienced in outdoor growing conditions that often occurs in the spring.

In addition to the cooling module 40 mitigating the heat from the lighting module 30, the lighting module is uniquely designed to further minimize the heat generated by the lights. The lighting module 40 advantageously employs a plurality of light-emitting diodes (LEDs) to provide light at the necessary wavelengths required for growth. The LEDS are considered "cool" light and further are arrayed to provide reflected light rather than direct light to further mitigate any heat generated by the lighting module 40. The grow cabinet 10 further mitigates the heat from the LEDS by dissipating heat through metal-to-metal contact in the lighting module.

Figure 6A:
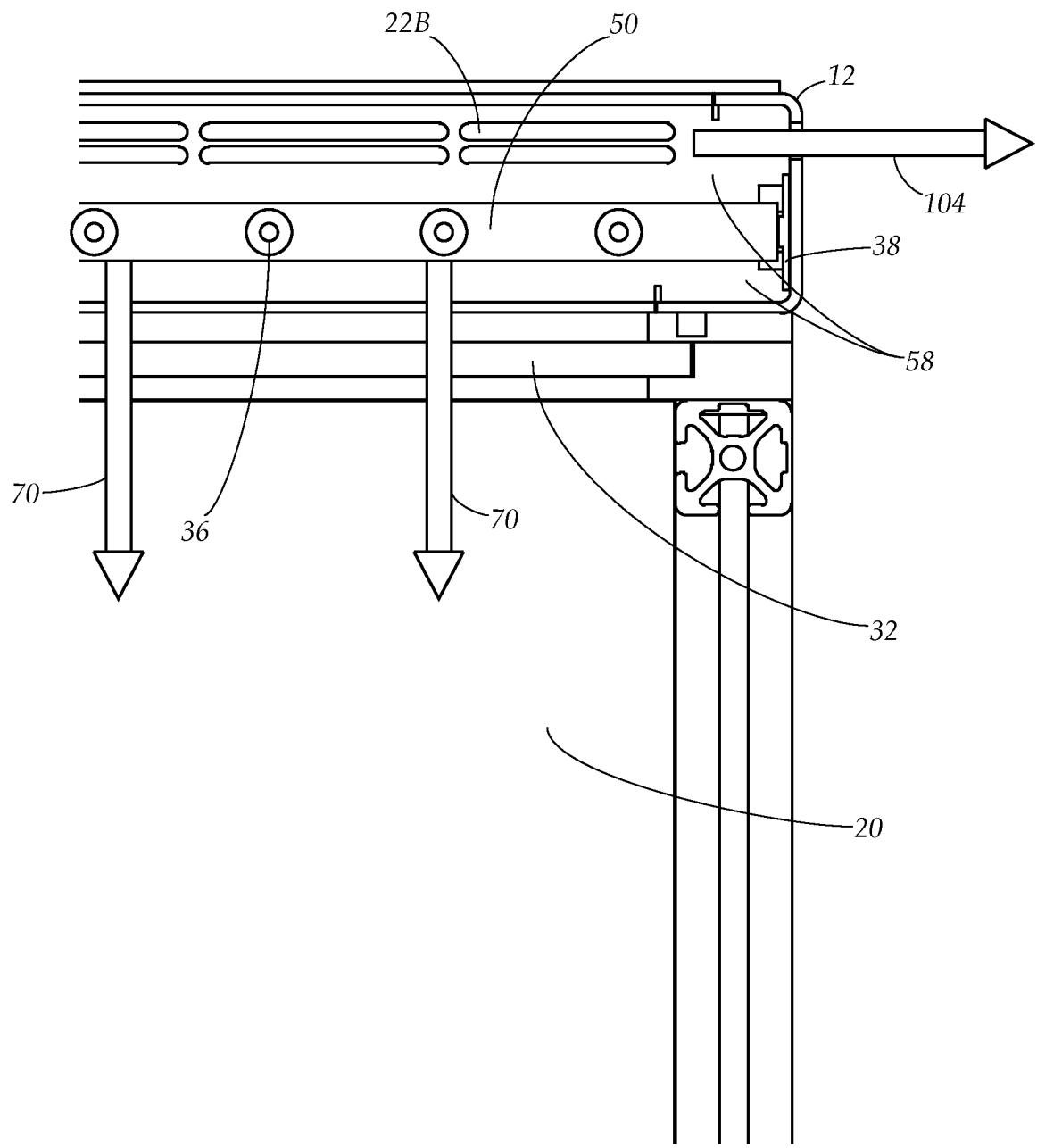
FIG. 6A is a partial rear elevational view of an upper right corner of the grow cabinet with a rear panel removed.
Figure 6B:
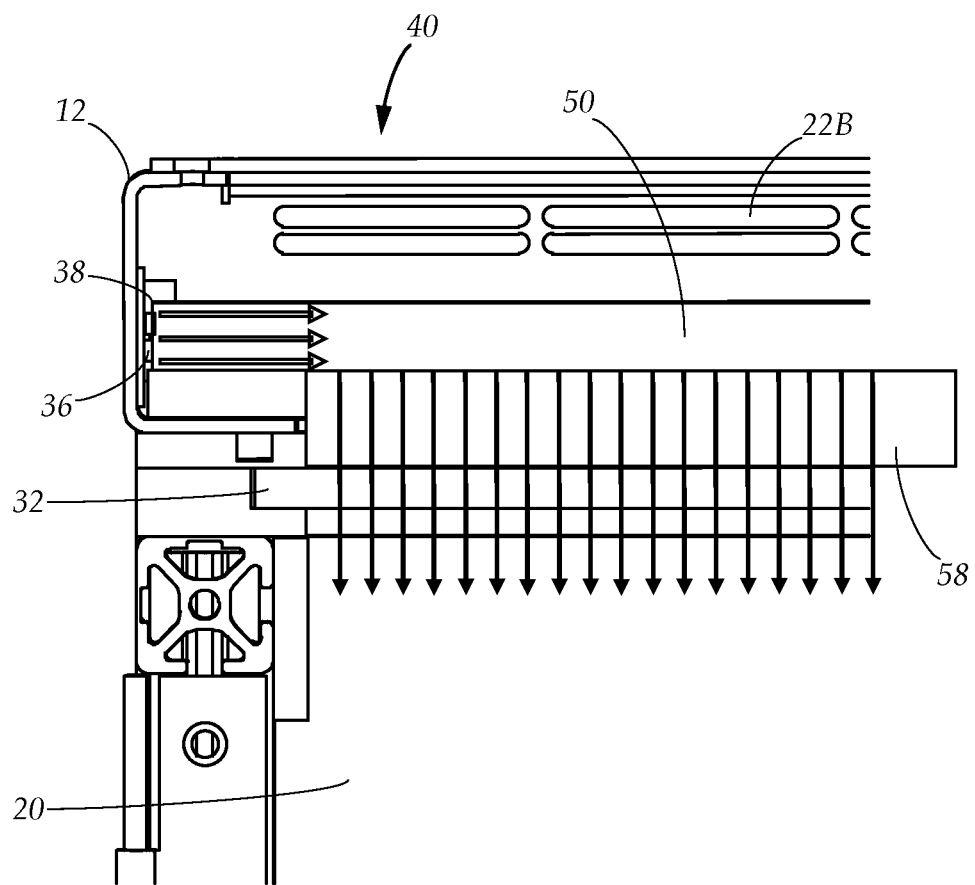
FIG. 6B is a partial rear elevational view of an upper left corner of the grow cabinet with a rear panel removed.

FIGS. 6A and 6B show in detail the structure of the lighting module 40. The lighting module 40 further comprises a light guide plate 50 disposed within a metal heat-dissipating frame 38 above the growing chamber 20, the metal heat-dissipating frame in contact with a metal exterior shell 12 of the grow cabinet 10. In one example embodiment, the heat-dissipating frame 38 has an L-shaped edge.

Between the light guide plate 50 and the growing chamber 20 is the heat insulating material 32. Above the heat insulating material 32 and above the light guide plate 50 is a pair of insulating air layers 58 to further isolate any heat generated by the LEDs. The insulating air layer 58 above the light guide plate 50 is dynamically supplied from the cooling module 40 as explained hereinabove and moves outside the grow cabinet through the vents 22B.

In the example embodiment, a plurality of white light LEDs 34 are arrayed along the longer side of the grow cabinet 10 and a plurality of infrared light-emitting diodes (IR-LEDs) 36 along the shorter side of the grow cabinet. It is understood by those of ordinary skill, that the placement of the white light LEDs 34 and IR-LEDs 36 are not a limitation and that LEDs of other frequencies and other schemes of placement are possible within the inventive concept. In another example embodiment, UVA (long wave "A" ultraviolet) may be added to or substituted for the other LEDs to produce a different flavor and nutritional profile.

The white light LEDs 34 and IR-LEDs 36 are disposed within the heat-dissipating frame. The light guide plate 50 directs the light 70 downwardly into the growing chamber 20.

Figure 7:
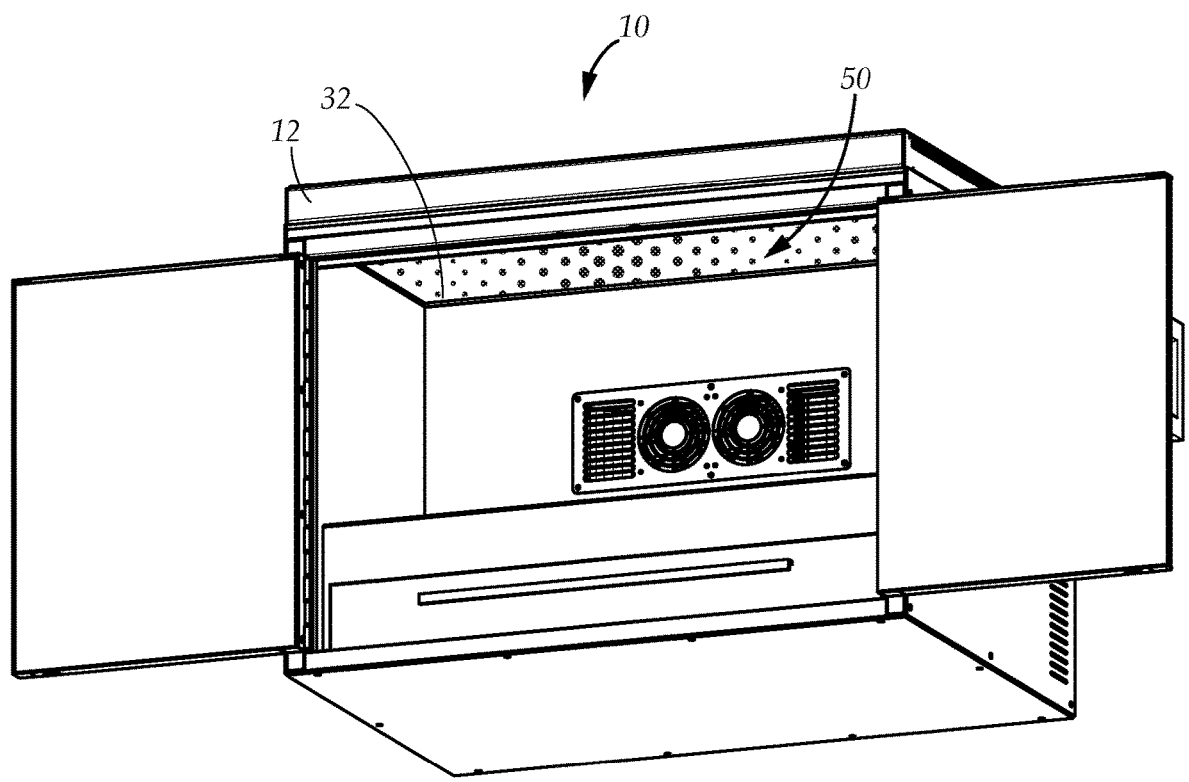
FIG. 7 is a front perspective view of the example embodiment of the interior of the grow cabinet in the grow cabinet system.
Figure 8A:
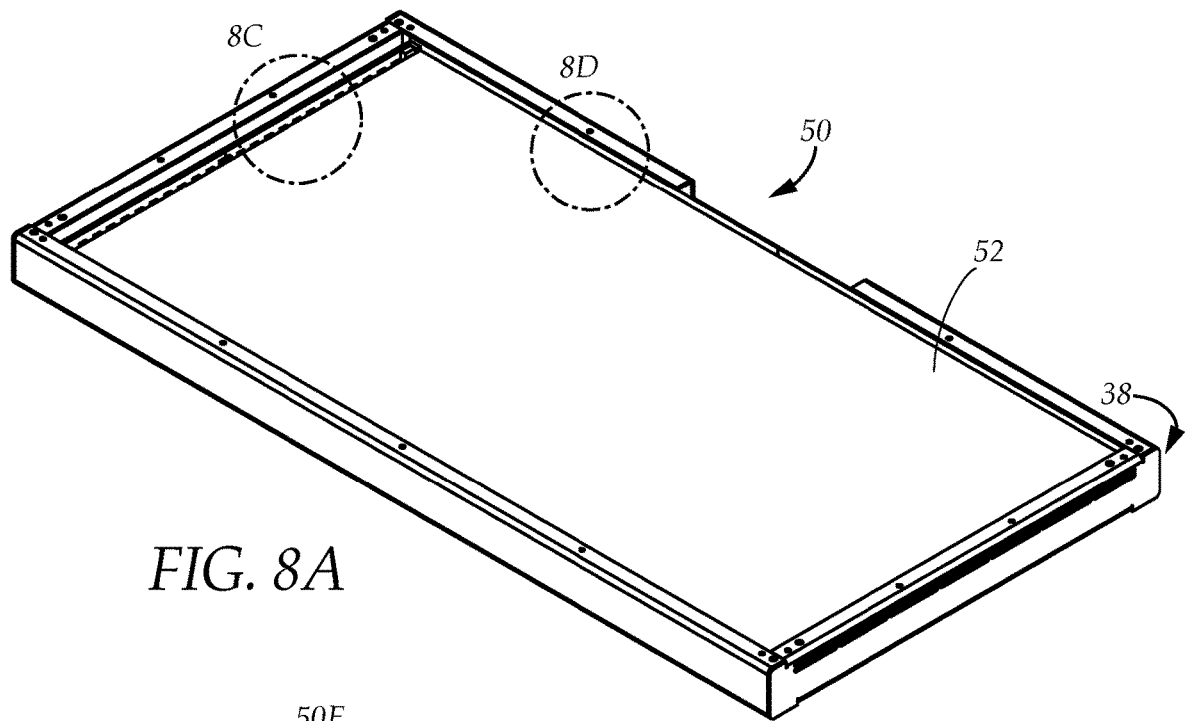
FIG. 8A is a perspective view of an example embodiment of a lighting module in the grow cabinet system.
Figure 8B:
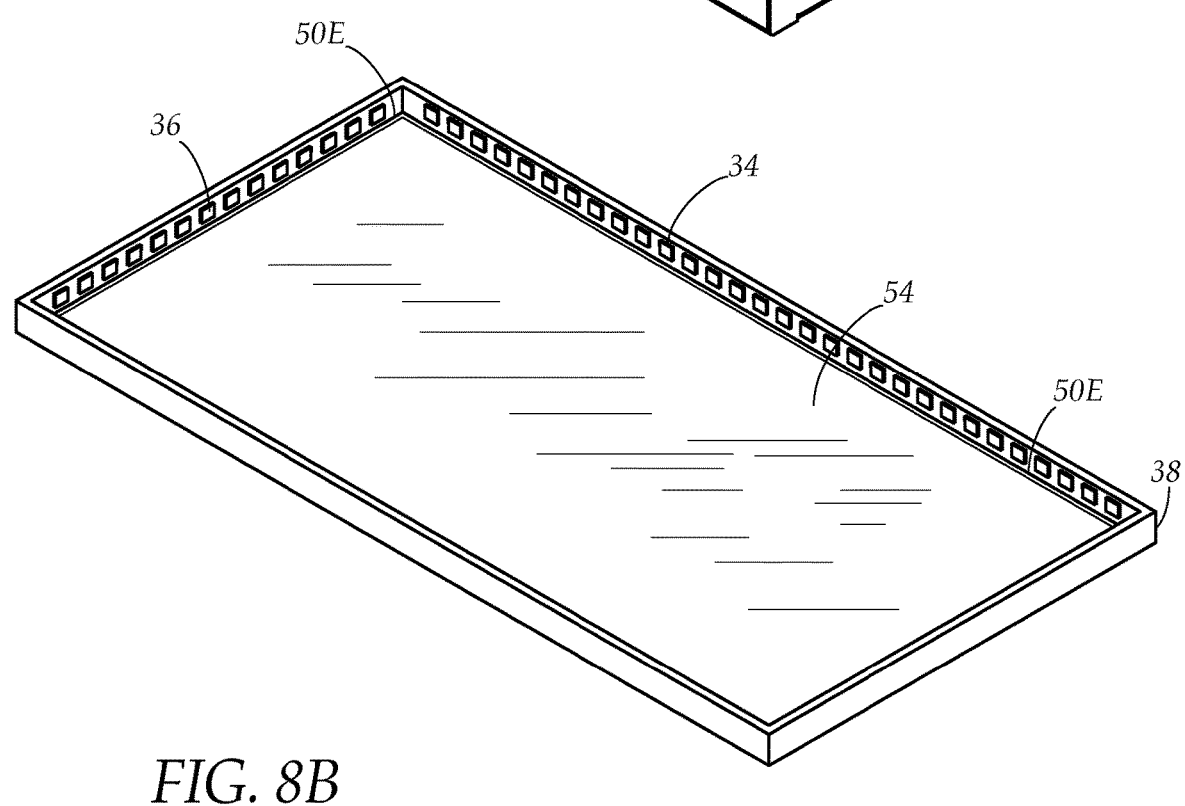
FIG. 8B is a perspective view of a lighting module frame in the example embodiment of the lighting module in the grow cabinet system.
Figure 8C:
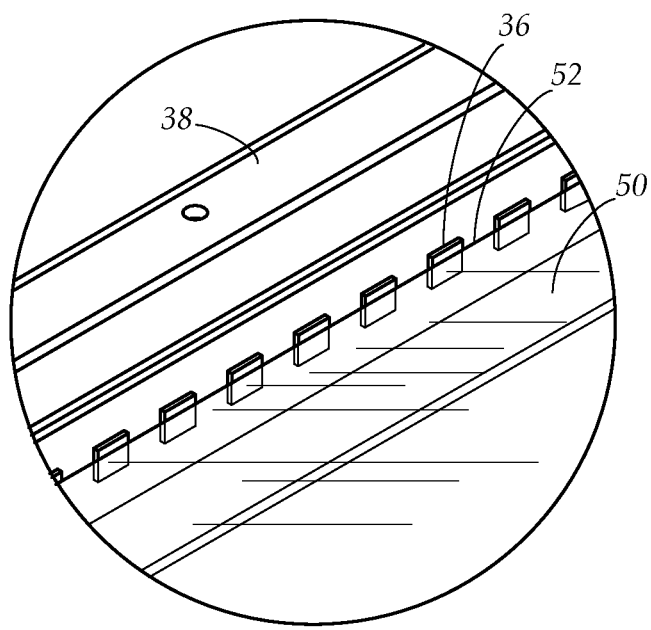
FIG. 8C is a sectional view of the lighting module frame in the example embodiment of the lighting module in the grow cabinet system.
Figure 8D:
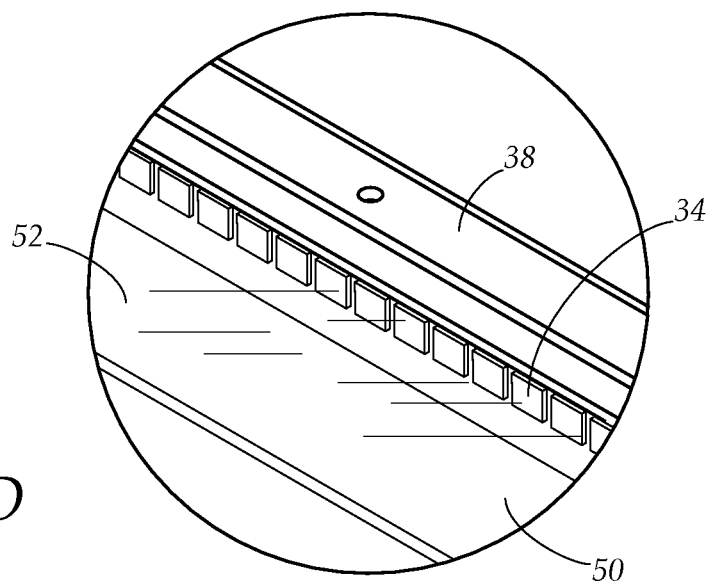
FIG. 8D is a sectional view of the lighting module frame in the example embodiment of the lighting module in the grow cabinet system.

The light guide plate 50 is shown in FIG. 7 through the translucent heat insulating material 32. The light guide plate 50 is within the exterior metal shell 12 of the grow cabinet 10 above the growing chamber 20. The light guide plate 50 is shown in detail in FIGS. 8A-D and 9.

Referring to FIGS. 8A-D and 9, the light guide plate 50 has a plurality of edges 50E. In this example embodiment, the white light LEDs in a strip are arrayed along the long edges 50E of the light guide plate 50, and the IR-LEDs are arrayed along the short edges 50E. The light guide plate 50 has a reflecting sheet 52, a translucent sheet 54 and a perforated sheet 56 therebetween, the LEDs 34 in strips and the IR-LEDs 36 in strips disposed along the edges 38E of the light guide plate.

Figure 10:
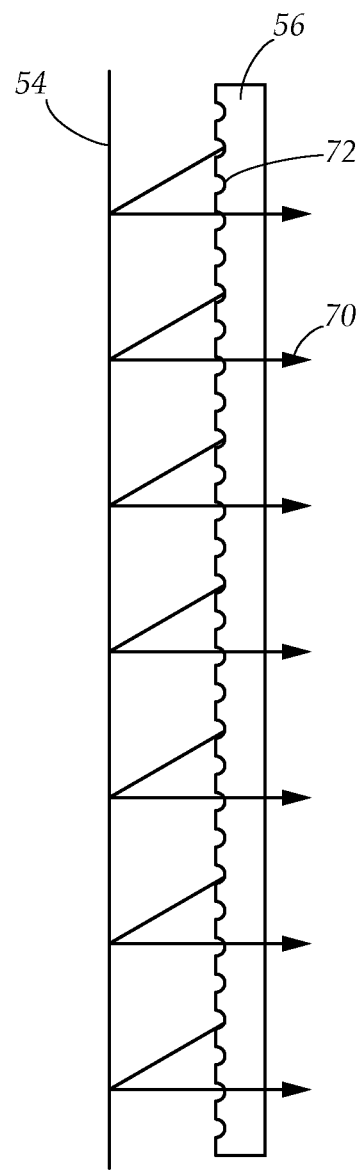
FIG. 10 is a diagram of light reflection in the example embodiment of the grow cabinet system.

The LEDs 34 in strips and the IR-LEDs 36 in strips are place such that light shines inwardly and upwardly towards a reflecting sheet 52 and reflects downwardly toward a perforated sheet 54 and through a translucent sheet 54. FIG. 10 shows how the light 70 is generated at an angle, reflects off the reflecting sheet 52 and travels through a plurality of perforations 72 in the perforated sheet 54.

Figure 9:
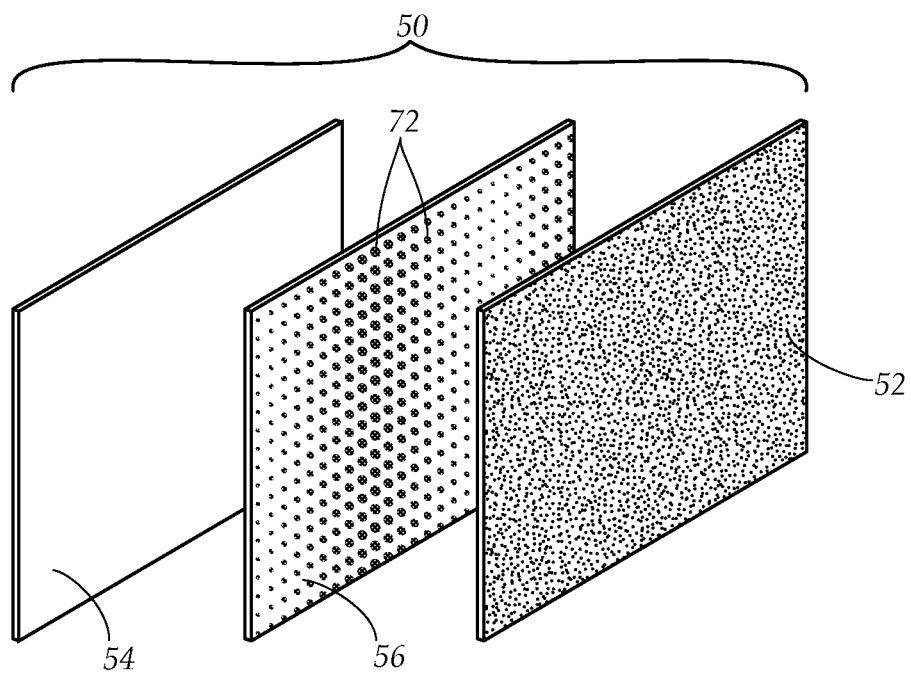
FIG. 9 is an exploded view of a lighting reflection module in the lighting module frame in the example embodiment of the lighting module in the grow cabinet system.

In FIG. 9, perforations 72 located near the edges 50E of the perforated sheet 54 of light guide plate 50 are small and round and have a large distance between them. The perforations 72 located in the middle of the light guide plate 50 are larger and elliptical. The light coming from the edges 50E reaches the growing chamber by diffusion through the perforations 72 and follow through the transparent sheet.

In theory, the closer to the light source, the stronger the light. The farther from the light source, the weaker the light. As the perforations 72 located on the edges 50E of the light guide plate 50 have a smaller diffusion effect, and the perforations 72 in the middle of the light guide plate 50 have a large diffusion effect, the light is evenly distributed. In one example embodiment, the lighting module 30 is controlled by the ECU 66.

Figure 2:
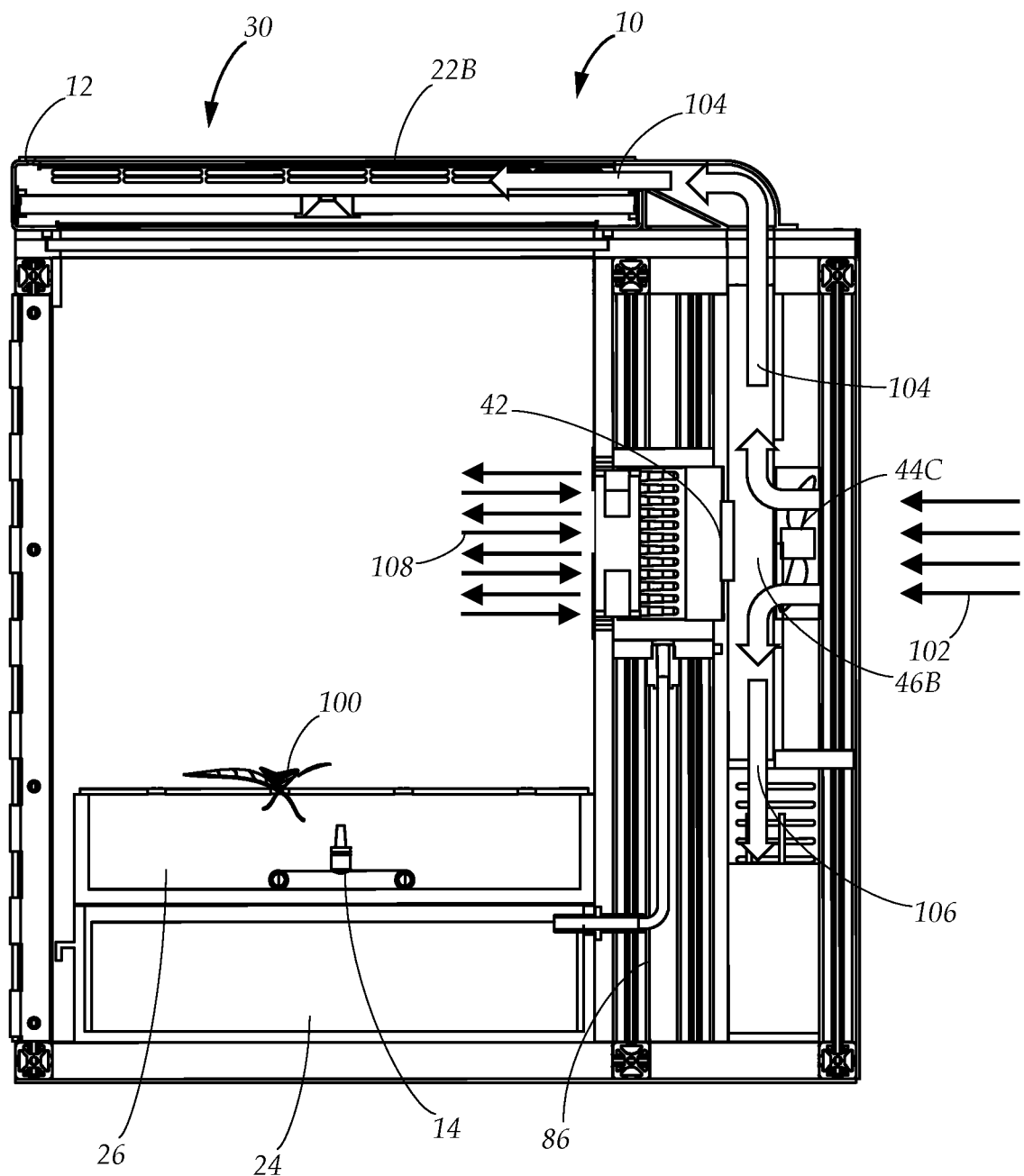
FIG. 2 is a cross-section view from the right side of the example embodiment of the grow cabinet showing air flow in the grow cabinet system.
Figure 3:
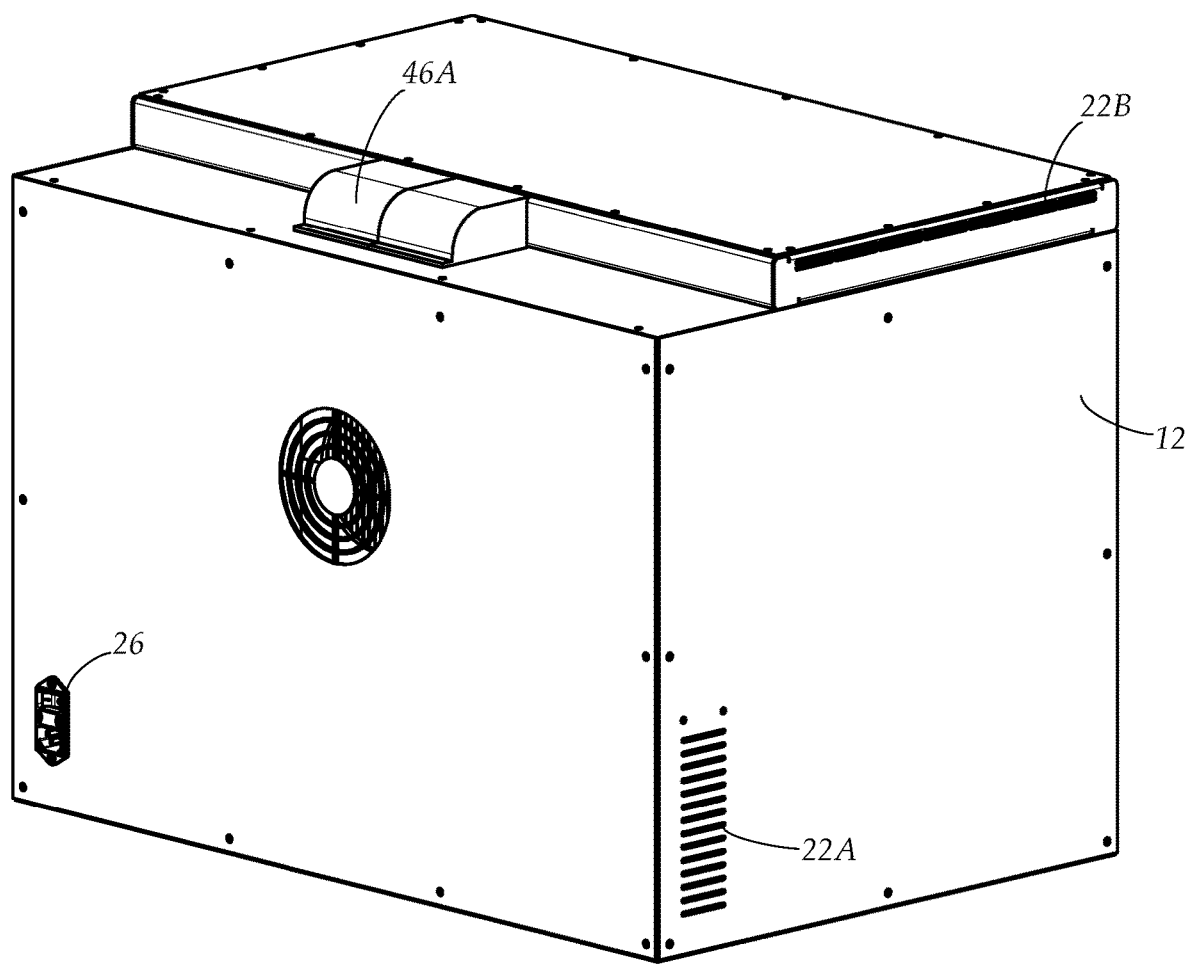
FIG. 3 is a perspective view from the rear of the example embodiment of the grow cabinet in a grow cabinet system.
Figure 4A:
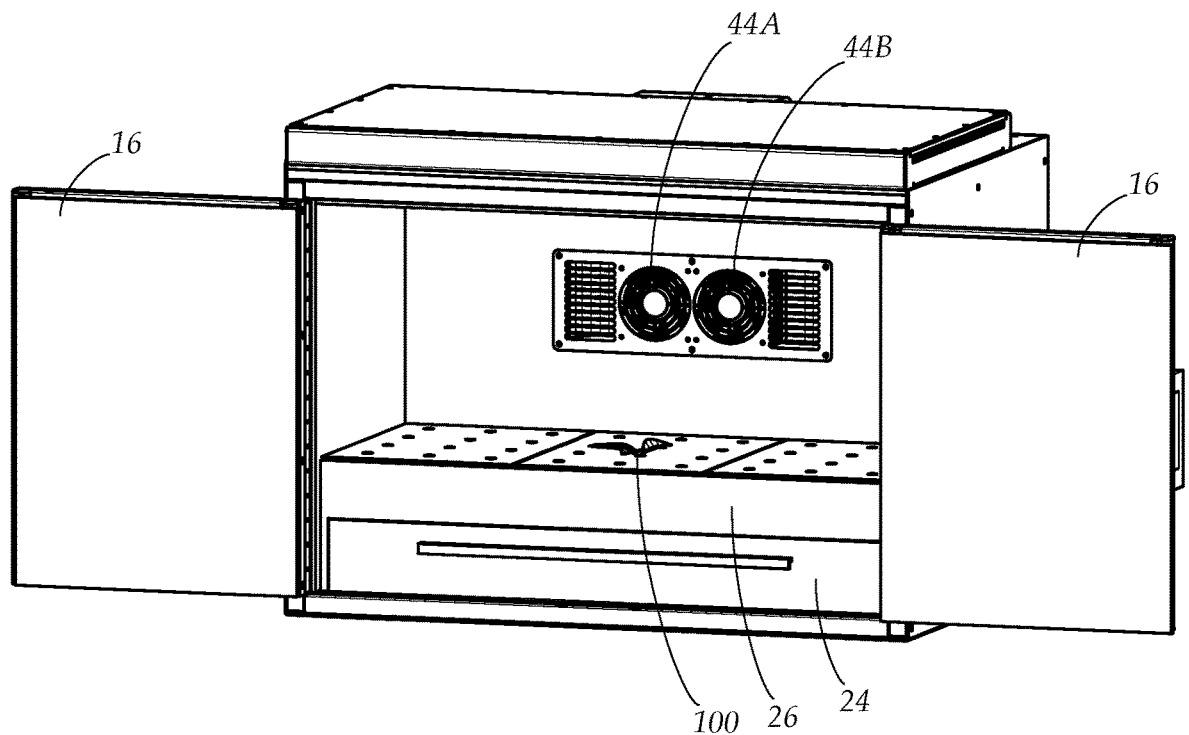
FIG. 4A is a perspective view of the example embodiment of an interior of the grow cabinet in the grow cabinet system.
Figure 4B:
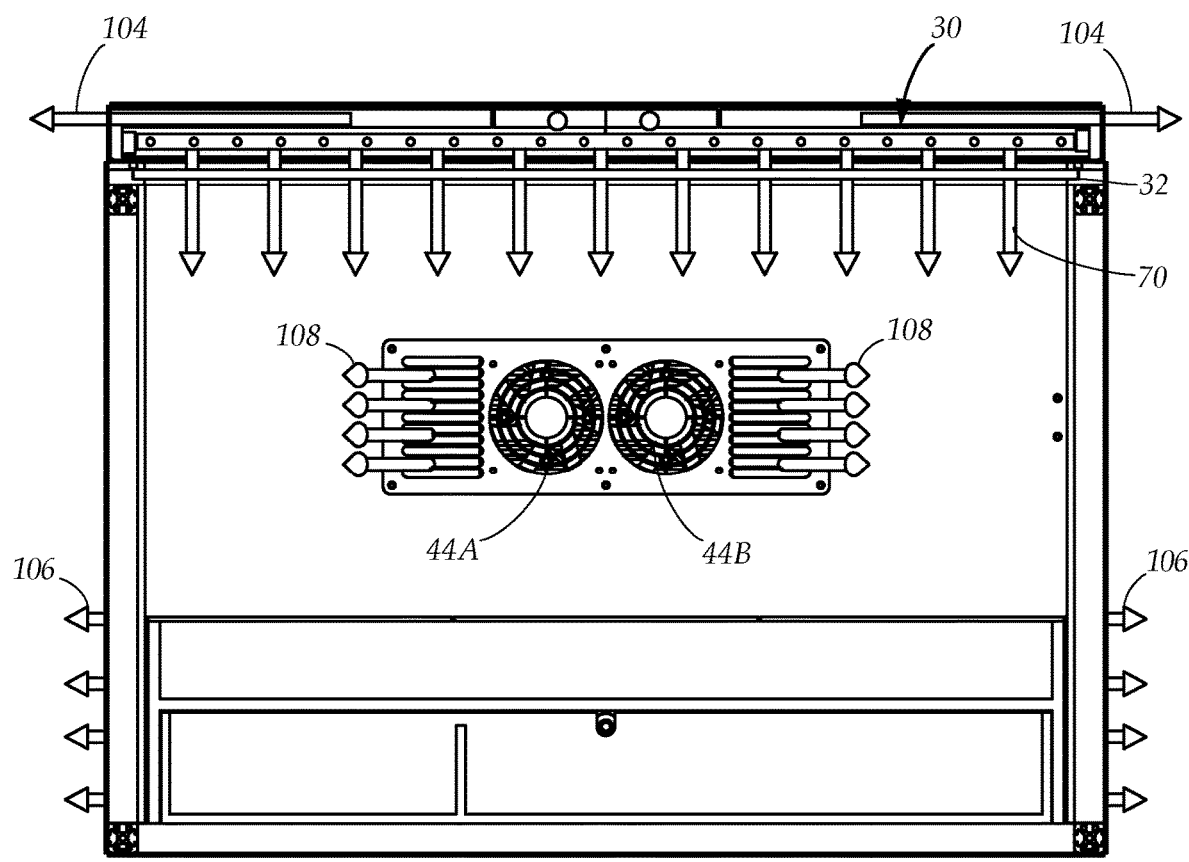
FIG. 4B is a front elevational view of the example embodiment of the interior of the grow cabinet with doors removed, showing the air flow in the grow cabinet system.
Figure 5:
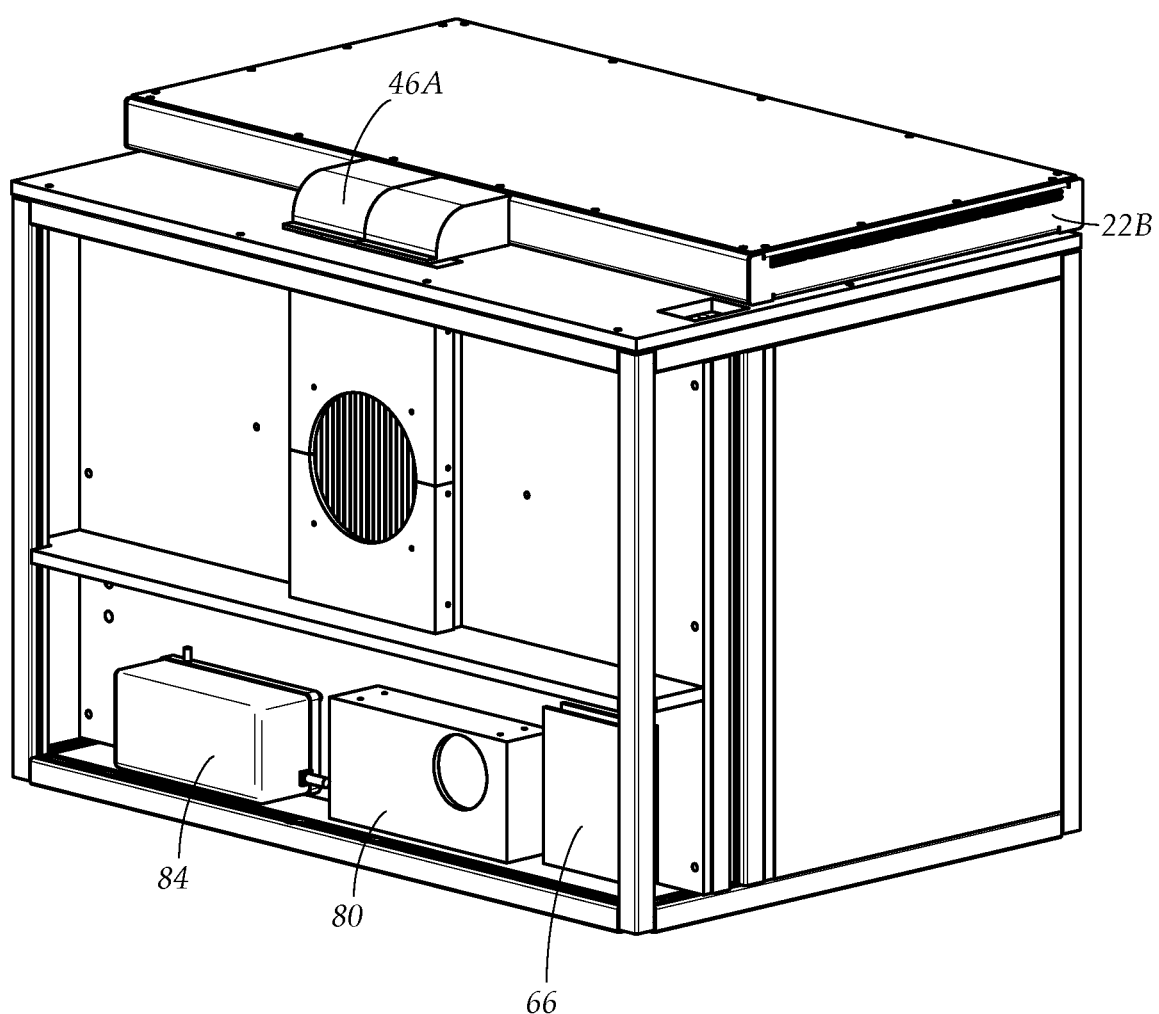
FIG. 5 is a perspective view from the rear off the example embodiment of the grow cabinet in the grow cabinet system with a rear panel removed.

Referring to FIGS. 1 and 2, at least one camera 68 is disposed on the heat insulating material 32 with the lens trained on the plants 100 in the growing chamber. The at least one camera monitors the growth of the plants 100 and transmits the images.

In one example embodiment, the images are transmitted to the ECU to provide feedback so that the growing conditions of light and temperature can be adjusted by adjusting the lighting module 30 and the cooling module 40. In another example embodiment, the at least one camera 68 is in wireless communication with a network such as the Internet or a local area network, either directly or indirectly through an application that runs on a handheld computing device, such as a smart phone or tablet, a computer such as laptop or desktop or similar electronic devices either presently known or developed in the future.

It is further understood by those of ordinary skill in the art, that a plurality of protocols that change conditions in the growing chamber 20 by adjusting the lighting module 30 and the cooling module 40 can be developed for a plurality of plants and plant characteristics and that the ECU is in wireless communication through an application that runs on a handheld computing device, such as a smart phone or tablet, a computer such as laptop or desktop or similar electronic devices either presently known or developed in the future. It is further understood by those of ordinary skill in the art that these protocols can imitate a countless number of growing conditions found in nature as well as creating artificial conditions for different plant characteristics.

It is further understood that the at least one camera 68 can operate a plurality of lens resulting in a plurality of spectral analysis of the plants 100 growing within, providing feedback to ECU on not only growth, but nutrient content, sugar content, water content, pigments and metabolite content to name just a few. In one example embodiment, hyperspectral imaging of the at least one camera provides such content analysis. In another example embodiment, the at least one camera 68 is a 6 CMOS chip digital sensor using a plurality of different filters for multispectral imaging to provide such content analysis.

In another example embodiment, photosynthetic performance is monitored by using a kinetic chlorophyll fluorescence imaging device, wherein the at least one camera 68 is a fluorcam, that is a charge-coupled device (CCD) camera coupled a with a source of measuring light pulses and a source of saturation light pulses.

In another example embodiment, the system has five (5) cameras, one in each upper corner of the growing chamber 20 and one in the middle. Using 3-D reconstruction from the five cameras, the system can analyze the morphology of the plants. Adding a projection mask to IR-LED in lighting module further enhances the morphology analysis.

The lighting module 30, the cooling module 40 and the growing chamber 20 within the metal exterior shell 12 as described hereinabove were intended to operate together as a sophisticated system within the grow cabinet 10, controlled by the ECU 66. The grow cabinet 10 may be a stand-alone system or electronically connected through the network to the application, the ECU 66 analyzing input from the at least one camera 68 and the sensor 64. Multiple grow cabinets may be electronically connected through the internet or through a local area network with the ECU 66 receiving instructions and the at least one camera 68 transmitting data.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a grow cabinet and a system for growing plants in the grow cabinet. The disclosure is illustrated by example in the drawing figures, and throughout the written description. It should be understood that numerous variations are possible, while adhering to the inventive concept. Such variations are contemplated as being a part of the present disclosure.

What is claimed is:

1. A system for growing plants in a grow cabinet, comprising:
   a growing chamber;
   a lighting module having a plurality of sides providing reflected indirect light to the growing chamber, the lighting module above the growing chamber with a layer of heat insulating material disposed therebetween, the growing chamber and the lighting module disposed within a grow cabinet; and
   a cooling module having a thermoelectric cooler, a plurality of air vents and a plurality of fans directing cooling air through a plurality of channels and out the plurality of air vents, a first fan pulling outside air directing cooling air into a first channel over the lighting module and directing cooling air into a second channel over an electronic control unit, a second fan pulling air from the growing chamber over the thermoelectric cooler and returning the cooled air to the growing chamber, and the third fan pulling air from the growing chamber and directing cooling air into the first channel over the light module and into the second channel over the electronic control unit.

2. The system as described in claim 1, wherein the lighting module further comprises a plurality of white light-emitting diodes (LEDs) and a plurality of infrared light-emitting diodes (IR-LEDs), a light guide plate having a plurality of edges, the light guide plate having a reflecting sheet, a translucent sheet and a perforated sheet therebetween, the LEDs and the IR-LEDs disposed along the plurality of edges of the light guide plate.

3. The system as described in claim 2, wherein the light guide plate, the LEDs and the IR-LEDs of the lighting module are disposed within a metal heat-dissipating frame above the growing chamber, the metal heat-dissipating frame in contact with a metal exterior shell of the grow cabinet and the cooling air from a first channel of the cooling module flowing over the lighting module and exiting out the air vents.

4. The system as described in claim 3, wherein the heat insulating material is a polycarbonate sheet disposed between the growing chamber and the lighting module, thermally insulating the growing chamber from the lighting module.

5. The system as described in claim 4, further comprising at least one camera inside the grow chamber, the at least one camera transmitting a plurality of images of a plurality of plants growing in the grow chamber to the electronic control unit, the electronic control unit analyzing the images and adjusting the lighting module and the cooling module.

6. A grow cabinet for growing plants, comprising:
a growing chamber;
a pump;
a cooling module configured for maintaining the growing chamber at a uniform temperature throughout the growing chamber, the cooling module having a thermoelectric cooler, a plurality of air vents and a plurality of fans directing cooling air through a plurality of channels and out the plurality of air vents, a first fan pulling outside air directing cooling air into a first channel and into a second channel over an electronic control unit, a second fan pulling air from the growing chamber over the thermoelectric cooler and returning the cooling air to the growing chamber, and the third fan pulling air from the growing chamber and directing cooling air into the first channel and into the second channel;
a lighting module providing indirect light to the growing chamber, the lighting module above the growing chamber with a layer of heat insulating material disposed therebetween, the lighting module cooled by cooling air from the first channel;
an electronic control unit configured for controlling the lighting module, the pump and the cooling module in the growing chamber, the electronic control unit cooled by cooling second channel; and
a metal cabinet shell, the growing chamber, the pump, the lighting module, the cooling module and electronic control unit disposed therein.

7. The grow cabinet as described in claim 6, wherein the lighting module further comprises a plurality of white light-emitting diodes (LEDs) and a plurality of infrared light-emitting diodes (IR-LEDs), a light guide plate having a plurality of edges, the light guide plate having a reflecting sheet, a translucent sheet and a perforated sheet therebetween, the LEDs and the IR-LEDs disposed along the plurality of edges of the light guide plate.

8. The grow cabinet as described in claim 7, wherein the light guide plate, the LEDs and the IR-LEDs of the lighting module are disposed within a metal heat-dissipating frame above the growing chamber, the metal heat-dissipating frame in contact with the metal cabinet shell.

9. The grow cabinet as described in claim 8, wherein the heat insulating material is a polycarbonate sheet disposed between the growing chamber and the lighting module, thermally insulating the growing chamber from the lighting module.

10. A system for growing plants in a grow cabinet, comprising:
a metal cabinet shell;
a growing chamber;
a lighting module providing indirect light to the growing chamber, the lighting module above the growing chamber with a layer of heat insulating material disposed therebetween; and
a cooling module configured for maintaining the growing chamber at a uniform temperature throughout the growing chamber, the cooling module having a thermoelectric cooler, a plurality of air vents in the metal cabinet shell and a plurality of fans directing cooling air through a plurality of channels and out the plurality of air vents, a first fan directing cooling air from outside the metal cabinet shell and into a first channel and into a second channel over an electronic control unit, a second fan pulling air from the growing chamber over the thermoelectric cooler and returning cooling air to the growing chamber, and the third fan pulling air from the growing chamber and directing cooling air into the first channel and into the second channel, the cooling module, growing chamber and lighting module disposed within the metal cabinet shell.

11. The system as described in claim 10, wherein the lighting module further comprises a light guide plate having a plurality of edges, the light guide plate having a reflecting sheet, a translucent sheet and a perforated sheet therebetween, a plurality of white light-emitting diodes (LEDs) and a plurality of infrared light-emitting diodes (IR-LEDs) disposed along the plurality of edges of the light guide plate, the light guide plate, the white-light LEDs and the IR-LEDs of the lighting module disposed within a metal heat-dissipating frame above the growing chamber, the metal heat-dissipating frame in contact with the metal cabinet shell.

* * * * *